(12) United States Patent
Zhao et al.

(10) Patent No.: US 10,887,428 B2
(45) Date of Patent: Jan. 5, 2021

(54) METHODS AND SYSTEMS FOR ALLOCATING SERVICE REQUESTS FROM MOBILE OBJECTS AMONG EDGE SERVERS

(71) Applicant: Toyota Motor Engineering & Manufacturing North America, Inc., Plano, TX (US)

(72) Inventors: Yecheng Zhao, Blacksburg, VA (US); BaekGyu Kim, Cupertino, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 24 days.

(21) Appl. No.: 16/407,224

(22) Filed: May 9, 2019

(65) Prior Publication Data
US 2020/0358877 A1 Nov. 12, 2020

(51) Int. Cl.
H04W 4/16 (2009.01)
H04L 29/08 (2006.01)
(Continued)

(52) U.S. Cl.
CPC .......... H04L 67/325 (2013.01); H04L 67/101 (2013.01); H04L 67/1008 (2013.01);
(Continued)

(58) Field of Classification Search
CPC .... G06Q 10/02; G06Q 50/30; G01C 21/3484; G01C 21/3492; G01C 21/3691;
(Continued)

(56) References Cited

U.S. PATENT DOCUMENTS

| | | |
|---|---|---|
| 6,141,759 A | 10/2000 | Braddy |
| 2003/0051042 A1 | 3/2003 | Tazoe |

(Continued)

FOREIGN PATENT DOCUMENTS

| | | |
|---|---|---|
| CN | 101561920 A | 10/2009 |
| WO | 2009098712 A2 | 8/2009 |

(Continued)

OTHER PUBLICATIONS

Tri D. T. Nguyen, Tien-Dung Nguyen, Van Dung Nguyen, Xuan-Qui Pham and Eui-Nam Huh; "Cost-Effective Resource Sharing In An Internet Of Vehicles-Employed Mobile Edge Computing Environment"; Online Article; Nov. 5, 2018; URL: https://www.mdpi.com/2073-8994/10/11/594.

(Continued)

*Primary Examiner* — Phuoc H Doan
(74) *Attorney, Agent, or Firm* — Dinsmore & Shohl LLP

(57) ABSTRACT

A method for allocating a service request from a mobile object is provided. The method includes receiving the service request and a route of the mobile object, determining estimated arrival times of the mobile object in a plurality of regions based on the route, the plurality of regions being associated with a plurality of regional servers, respectively, determining a region among the plurality of regions based on the estimated arrival times of the mobile object in the plurality of regions and an estimated time for fulfilling the service request, and transmitting the service request to a regional server corresponding to the determined region.

20 Claims, 8 Drawing Sheets

(51) Int. Cl.
   *H04W 4/50*     (2018.01)
   *H04W 4/40*     (2018.01)
(52) U.S. Cl.
   CPC ........ *H04L 67/1021* (2013.01); *H04L 67/327* (2013.01); *H04W 4/40* (2018.02); *H04W 4/50* (2018.02)
(58) Field of Classification Search
   CPC ...... G01C 21/20; G08G 1/202; H04L 69/161; H04W 4/90; H04W 68/005; H04W 4/029; G01S 19/21
   USPC ...................................... 370/310; 455/414.1
   See application file for complete search history.

(56)                References Cited

U.S. PATENT DOCUMENTS

2015/0046591 A1     2/2015  Zhu et al.
2017/0138751 A1*    5/2017  Martyniv ............... G01C 21/20

FOREIGN PATENT DOCUMENTS

WO        2017176329 A1    10/2017
WO        2018054476 A1     3/2018
WO        2018182732 A1    10/2018

OTHER PUBLICATIONS

Haisheng Tan, Zhenhua Han, Xiang-Yang Li, Francis C.M. Lau; "Online Job Dispatching And Scheduling In Edge-Clouds"; Publication; INFOCOM 2017—IEEE Conference on Computer Communications, IEEE. IEEE; Atlanta GA; May 1, 2017.

* cited by examiner

US 10,887,428 B2

METHODS AND SYSTEMS FOR ALLOCATING SERVICE REQUESTS FROM MOBILE OBJECTS AMONG EDGE SERVERS

TECHNICAL FIELD

The present specification relates to allocating service requests from mobile objects among edge servers, and more particularly, to allocating and scheduling service requests from mobile objects among edge servers based on the routes of the mobile objects and estimated times for fulling the service request.

BACKGROUND

Edge computing complements cloud computing systems in some environment. Edge computing brings computation and storage capability to the proximity of demand in order to significantly reduce latency experienced by end user. To maximize such benefits, computation requests from end users need to be allocated to geometrically nearby edge servers whenever possible. Issues with respect to service request allocation arise when considering service requests submitted from on-road vehicles because on-road vehicles move quickly. The edge server currently closest to the request submitting vehicle may be several miles away in a matter of minutes. This presents significant challenges when choosing which edge server to process a service request from vehicle. For example, consider a naïve strategy where the service request is allocated to the closest edge server at the time of submission by the vehicle. The vehicle may have moved far away from the server by the time the request is fulfilled, which loses the benefit of edge computing.

Accordingly, a need exists for providing a method and system that allocates a request from a mobile object such that a processing edge server is to be close to the mobile object when the service request is fulfilled.

SUMMARY

In one embodiment, a method for allocating a service request from a mobile object is provided. The method includes receiving the service request and a route of the mobile object, determining estimated arrival times of the mobile object in a plurality of regions based on the route, the plurality of regions being associated with a plurality of regional servers, respectively, determining a region among the plurality of regions based on the estimated arrival times of the mobile object in the plurality of regions and an estimated time for fulfilling the service request, and transmitting the service request to a regional server corresponding to the determined region.

In another embodiment, a system for allocating a service request is provided. The system includes a plurality of regional servers, and a central server. The central server is configured to: receive, from a mobile object, the service request and a route of the mobile object, determine estimated arrival times of the mobile object in a plurality of regions based on the route, the plurality of regions being associated with the plurality of regional servers, respectively, determine a region among the plurality of regions based on the estimated arrival times of the mobile object in the plurality of regions and estimated time for fulfilling the service request, and transmit the service request to a regional server corresponding to the determined region.

In yet another embodiment, a method for allocating a service request of a mobile object is provided. The method includes receiving the service request and a route of the mobile object, determining estimated arrival times of the mobile object at one or more edge servers in a region based on the route, selecting one of the one or more edge servers based on the estimated arrival times of the mobile object at the one or more edge servers and estimated times for fulfilling the service request by the one or more edge servers, and allocating the service request to the selected edge server.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
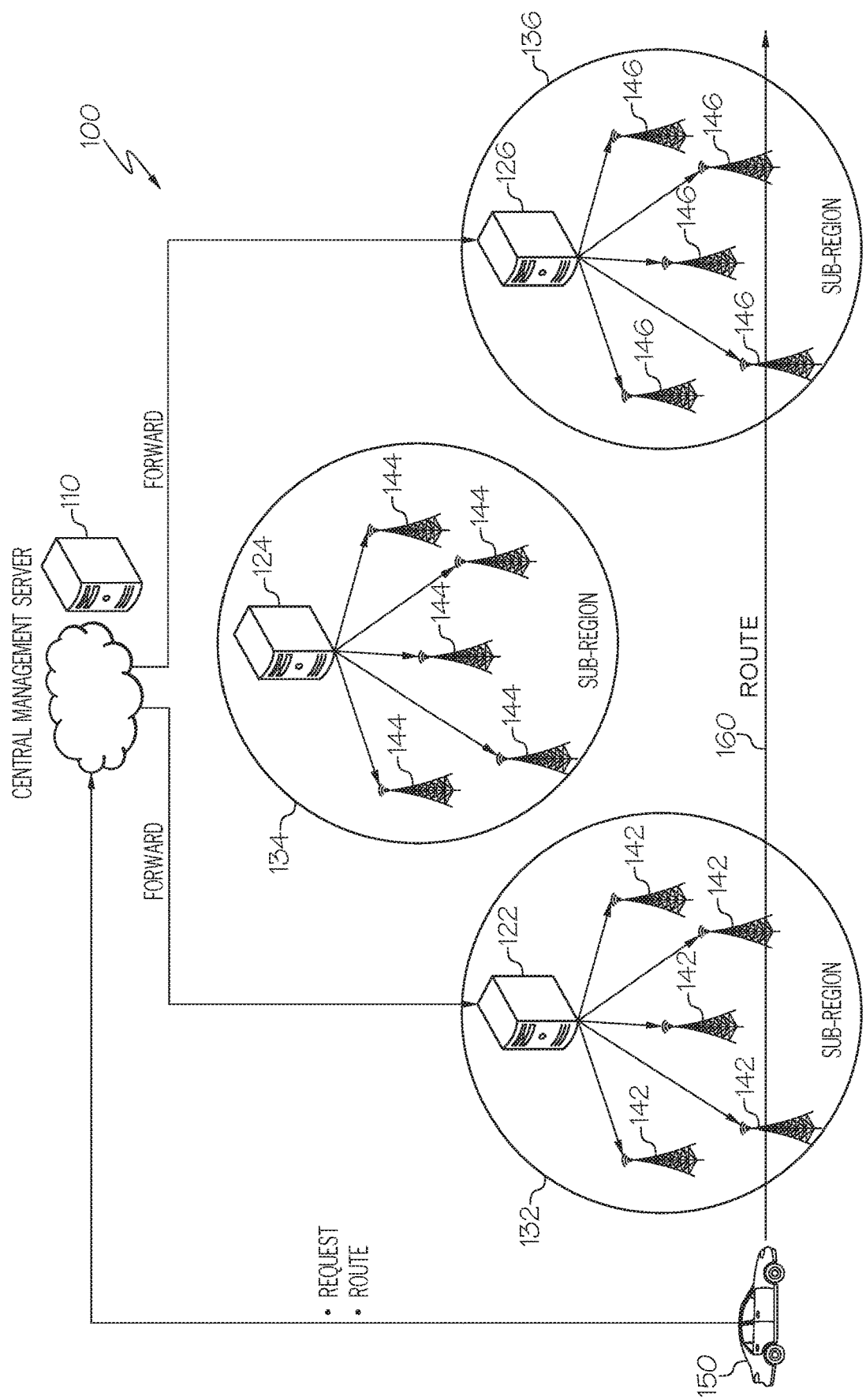
FIG. 1 schematically depicts a system for allocating a service request to an edge server, in accordance with one or more embodiments shown and described herein.
Figure 6:
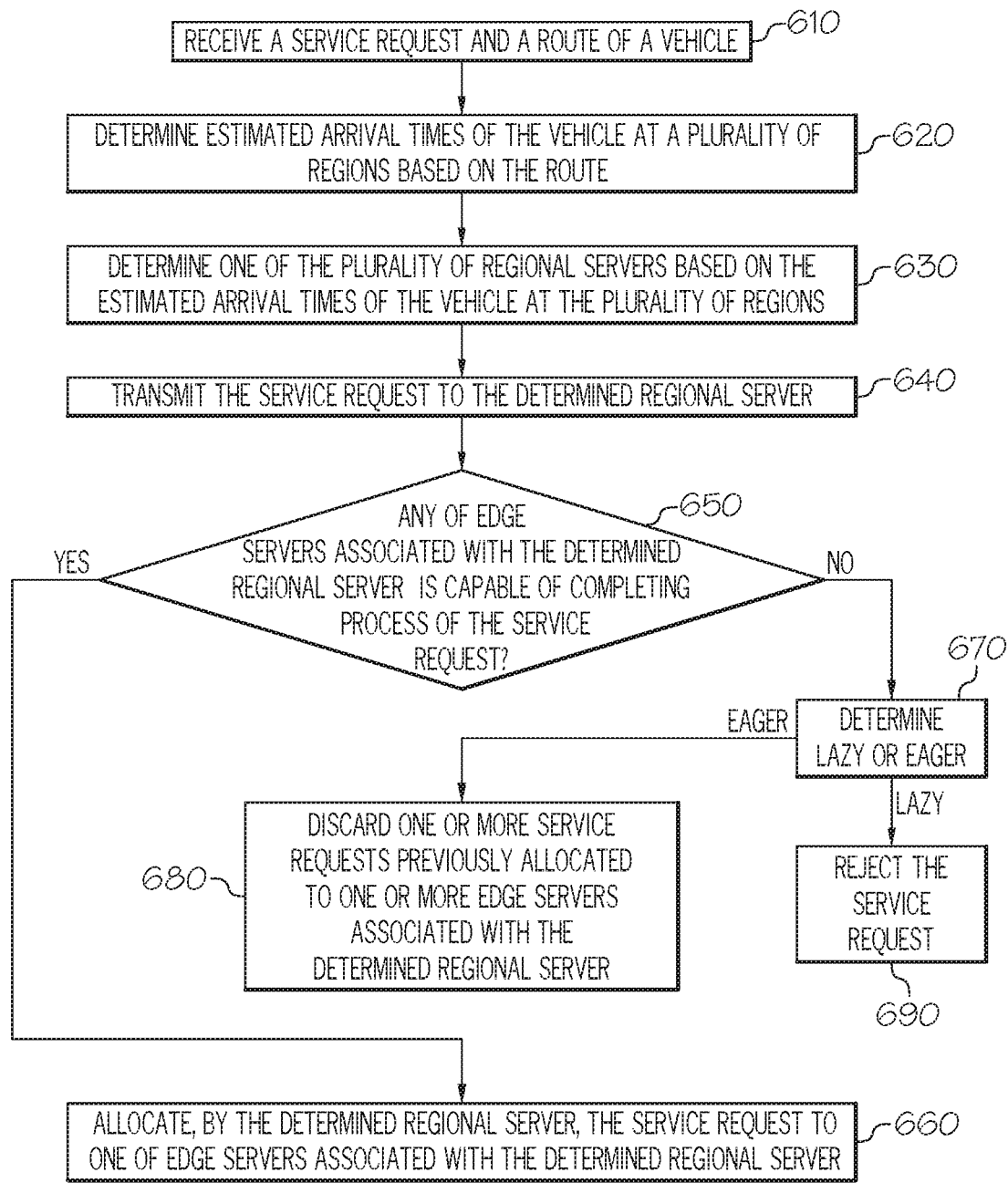
FIG. 6 depicts a flowchart of allocating and scheduling a service request from a mobile object, according to one or more embodiments shown and described herein.

The embodiments disclosed herein include systems and methods for allocating and scheduling service requests from mobile objects among edge servers based on the routes of the mobile objects and estimated times for fulling the service request. Referring to FIGS. 1 and 6, a central management server 110 receives a service request and a route 160 of the mobile object 150 and determines estimated arrival times of the mobile object in a plurality of regions 132, 134, 136 based on the route. The plurality of regions 132, 134, 136 are associated with a plurality of regional management servers 122, 124, 126, respectively. The central management server 110 determines a region among the plurality of regions based on the estimated arrival times of the mobile object in the plurality of regions and estimated time for fulfilling the service request, and transmits the service request to a regional server corresponding to the determined region. The regional server selects one of edge servers in the determined region and allocates the service request to the selected edge server such that the service request is fulfilled by the selected edge server before the mobile object arrives at the selected edge server.

The allocated edge server for processing the submitted service request is typically geographically close to the vehicle upon service request fulfillment. This not only help reduce data transmission latency but also the data transmission cost charged by a network provider. Specifically, if a service request is allocated to an edge server and fulfilled before the submitting mobile object arrives at the edge server, a cost including a transmission cost and a computation cost may be significantly reduced.

FIG. 1 schematically depicts a system for allocating a service request to an edge server, in accordance with one or more embodiments shown and described herein. In FIG. 1, the system 100 includes a central management server 110, and a plurality of regional management servers, for example, regional management servers 122, 124, 126. The plurality of regional management servers 122, 124, 126 are communicatively coupled to the central management server 110. The central management server 110 may be deployed in a cloud computing system, and manage the plurality of regional management servers 122, 124, 126.

Each of the regional management servers communicates with one or more edge servers located within the corresponding region. For example, the regional management server 122 communicates with and controls the edge servers 142 in a region 132, the regional management server 124 communicates with and controls the edge servers 144 in a region 134, and the regional management server 126 communicates with and controls the edge servers 146 in a region 136. Each of the regional management servers manages the allocation and scheduling of service requests from a plurality of mobile objects on edges servers within its region, which will be described in detail below.

In FIG. 1, a mobile object 150 may move into one or more of the regions 132, 134, 136. The mobile object may be a vehicle including an automobile or any other passenger or non-passenger vehicle such as, for example, a terrestrial, aquatic, and/or airborne vehicle. In some embodiments, the vehicle is an autonomous vehicle that navigates its environment with limited human input or without human input. In another embodiment, the mobile object 150 may be an unmanned aerial vehicle (UAV), commonly known as a drone. The mobile object 150 submits a service request along with the route 160 of the mobile object 150 to the central management server 110. The route 160 of the mobile object 150 may be a route that the mobile object 150 is taking in the near feature. For example, the route of the mobile object 150 may be determined based the current location and a destination input by the driver of the mobile object 150 and other parameters such as traffic information. In some embodiments, the route of the mobile object 150 may be dynamically changed, and the mobile object 150 may transmit the updated route to the central management server 110 whenever the route is changed.

The central management server 110 may receive the route 160 from the mobile object 150, and determine regions that overlap with the route 160. In FIG. 1, the route 160 overlaps with the regions 132 and 136, and the central management server 110 may determine that the regions 132 and 136 are candidate regions to which the service request from the mobile object 150 is forwarded.

The central management server 110 may retrieve real-time traffic information, e.g., from a transportation authority, a plurality of vehicles, etc. Based on the real-time traffic information and the route 160 of the mobile object 150, the central management server 110 determines expected arrival time of the mobile object 150 in one or more regions. For example, the central management server 110 may determine the expected arrival time of the mobile object 150 in the region 132 and the expected arrival time of the mobile object 150 in the region 136, respectively.

In embodiments, the central management server 110 may select one or more of the regions and forward the service request to the selected regions. The central management server 110 may select one or more of the regions based on various factors.

First, the central management server may consider the probability of successfully allocating the service request to an edge server. When the service request is forwarded to a region, the regional management server of the region tries to allocate and schedule the service request to one or more of its edge servers. An edge server is selected such that the expected request fulfillment time is no later than the expected arrival time of the vehicle at the edge server. That is, the selected edge server is required to complete processing of the service request before the vehicle arrives at the selected edge server such that the selected edge server may transmit the processing result to the vehicle when the vehicle arrives at the selected edge server. The expected request fulfillment time is an expected time required for completely processing the service request by the edge server. For example, by referring to FIG. 3, the expected request fulfillment time of the edge server 142-2 may be 12 minutes, and the mobile object 150 is estimated to arrive at the edge server 142-2 in 14 minutes. Because the edge server 142-2 is able to complete processing of the service request before the mobile object 150 arrives at the edge server 142-2, the region 132 may be a candidate region for processing the service request from the mobile object 150.

As the service request is forwarded to more regions, the likelihood that the request will be successfully accepted by one of the regions becomes greater. Thus, the number of regions may be chosen such that there is a reasonable likelihood that the request can be successfully allocated.

Second, the central management server may consider the workload of different regions in selecting regions. Each of the regions are subject to two types of workload. The first is the request processing workload on each edge server in the region. The second is the management workload at the regional management server. Specifically, when a new request is forwarded to the regional management server, the regional management server may need to perform additional arbitration, optimization and search space exploration in order to determine the best edge server in the region to allocate the service request and the priority of scheduling on that edge server. The process consumes additional computation time and resource and may decrease real-time performance if overloaded.

If none of the regions that received the forwarded service request is able to successfully allocate and schedule the service request, the service request is then processed in the cloud servers using traditional load balancing and request allocation technique (e.g., round-robin).

Figure 2:
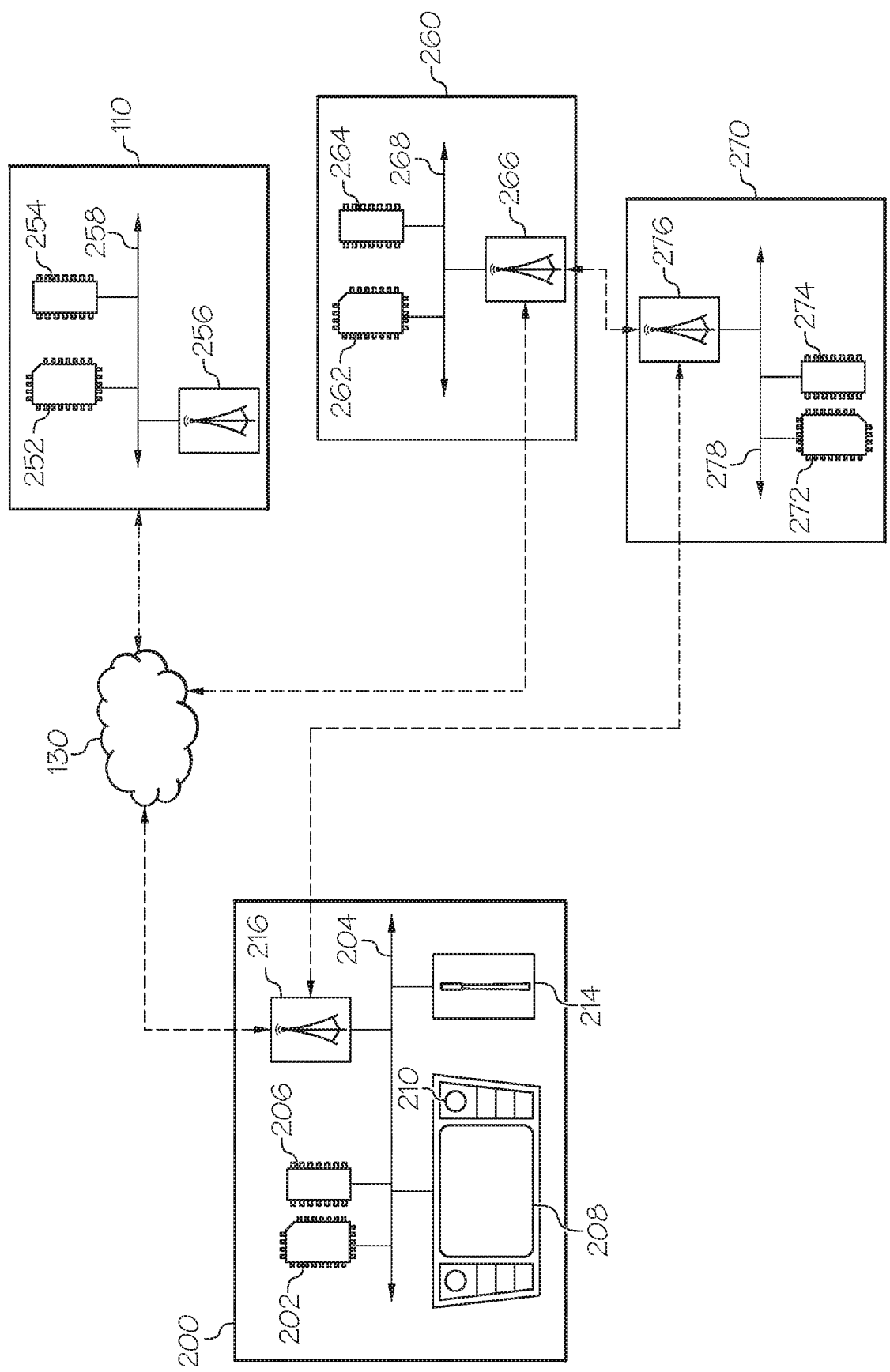
FIG. 2 depicts a schematic diagram of the system for allocating a service request to an edge server, in accordance with one or more embodiments shown and described herein.

FIG. 2 depicts a schematic diagram of the system for allocating a service request to an edge server, in accordance with one or more embodiments shown and described herein. It is noted that, while the vehicle system 200 is depicted in isolation, the vehicle system 200 may be included within a vehicle in some embodiments, for example, within the mobile object 150 of FIG. 1. In embodiments in which the vehicle system 200 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a screen 208 for providing visual output such as, for example, maps, navigation, entertainment, seat arrangements or a combination thereof. The screen 208 may output one of map, navigation, and entertainment. The screen 208 is coupled to the communication path 204. Accordingly, the communication path 204 communicatively couples the screen 208 to other modules of the vehicle system 200 including, without limitation, the one or more processors 202 and/or the one or more memory modules 206. In embodiments, the screen 208 may be a touchscreen that, in addition to visually displaying information, detects the presence and location of a tactile input upon a surface of or adjacent to the screen 208. For example, a driver or occupant of the vehicle may input a destination of the vehicle or a service request through the screen 208. Accordingly, each display may receive mechanical (e.g., touch) input directly upon the optical output provided by the screen 208.

The vehicle system 200 comprises tactile input hardware 210 coupled to the communication path 204 such that the communication path 204 communicatively couples the tactile input hardware 210 to other modules of the vehicle system 200. The tactile input hardware 210 may be any device capable of transforming mechanical, optical, or electrical signals into a data signal capable of being transmitted with the communication path 204. Specifically, the tactile input hardware 210 may include any number of movable objects that each transform physical motion into a data signal that can be transmitted over the communication path 204 such as, for example, a button, a switch, a knob, a microphone or the like. A driver or occupant of the vehicle may input a destination of the vehicle or a service request through the screen 208.

The vehicle system 200 comprises a satellite antenna 214 coupled to the communication path 204 such that the communication path 204 communicatively couples the satellite antenna 214 to other modules of the vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

Still referring to FIG. 2, the vehicle system 200 may be communicatively coupled to the central management server 110 by a network 130. In one embodiment, the network 130 may include one or more computer networks (e.g., a personal area network, a local area network, or a wide area network), cellular networks, satellite networks and/or a global positioning system and combinations thereof. Accordingly, the vehicle system 200 can be communicatively coupled to the network 130 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the vehicle system 200 comprises network interface hardware 216 for communicatively coupling the vehicle system 200 to the central management server 110. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the vehicle system 200 may transmit its service request along with its route to the central management server 110.

The central management server 110 includes one or more processors 252, one or more memory modules 254, network interface hardware 256, and a communication path 258. The one or more processors 252 may be a controller, an integrated circuit, a microchip, a computer, or any other computing device. The one or more memory modules 254 may comprise RAM, ROM, flash memories, hard drives, or any device capable of storing machine readable and executable instructions such that the machine readable and executable instructions can be accessed by the one or more processors 252. The network interface hardware 256 communicates with a regional management server 260. For example, the network interface hardware 266 forwards the service request from the vehicle system 200 to the regional management server 260. The regional management server 260 may correspond to one of the regional management servers 122, 124, 126 in FIG. 1.

The regional management server 260 includes one or more processors 262, one or more memory modules 264, network interface hardware 266, and a communication path 268. The one or more processors 262 may be a controller, an integrated circuit, a microchip, a computer, or any other computing device. The one or more memory modules 264 may comprise RAM, ROM, flash memories, hard drives, or any device capable of storing machine readable and executable instructions such that the machine readable and executable instructions can be accessed by the one or more processors 262. The network interface hardware 266 communicates with the central management server 110 by the network 130 or with an edge server 270. For example, the network interface hardware 266 transmits the service request from the vehicle system 200 to the edge server 270. The edge server 270 may correspond to one of the edge servers 142, 144, 146 in FIG. 1.

The edge server 270 includes one or more processors 272, one or more memory modules 274, network interface hardware 276, and a communication path 278. The one or more processors 272 may be a controller, an integrated circuit, a microchip, a computer, or any other computing device. The one or more memory modules 274 may comprise RAM, ROM, flash memories, hard drives, or any device capable of storing machine readable and executable instructions such that the machine readable and executable instructions can be accessed by the one or more processors 272. The one or more processors 272 of the edge server 270 may process the task for the service request from the vehicle system 200, and forward the processing result when the vehicle system 200 is within the communication range of the edge server 270.

Figure 3:
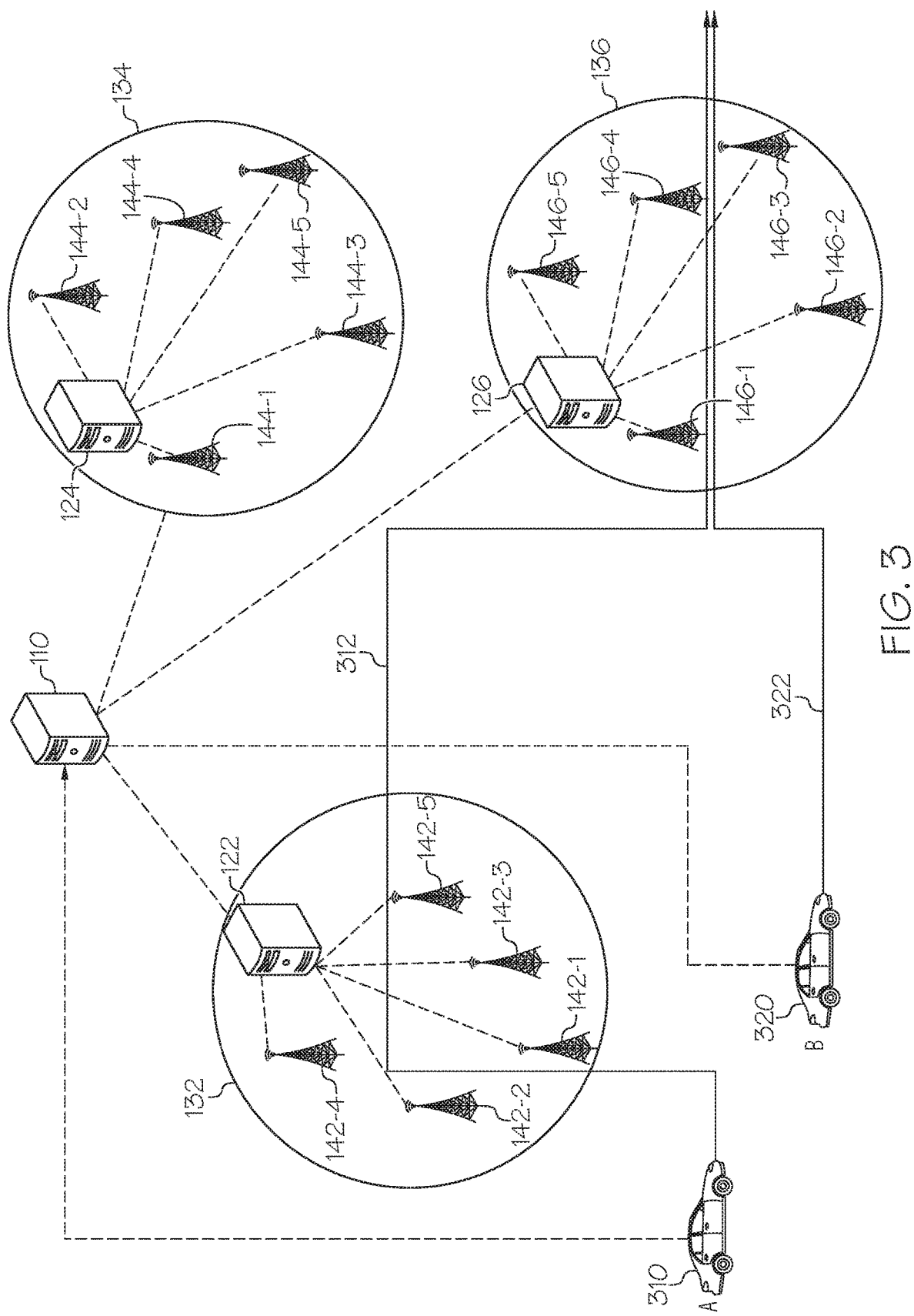
FIG. 3 depicts an example of request allocation and schedule in a region, according to one or more embodiments shown and described herein.

FIG. 3 depicts an example of request allocation and scheduling in a region, according to one or more embodiments shown and described herein. When a regional management server receives a new service request, the regional management server may try to allocate and schedule the service request on one of its edge servers in the region. For example, in FIG. 3, the central management server 110 may receive a service request from a vehicle A 310 and forward the service request to the regional management server 126. Similarly, the central management server 110 may receive a service request from a vehicle B 320 and forwards the service request to the regional management server 126.

Each of the regional management servers may try to allocate and schedule service requests such that the service requests can be fulfilled before vehicles submitting the requests arrive in corresponding region or at one of the edge services in the corresponding region. For example, the regional management server 126 may try to allocate and schedule the service requests from the vehicle A 310 and the vehicle B 320 such that they can be fulfilled before the vehicle A 310 and the vehicle B 320 arrive in the region 136 or at one of the edge servers 146-1, 146-2, 146-3, 146-4, 146-5 in the region 136.

A regional management server may search for feasible edge servers based on the location of edge servers and workload level information of the edge servers, and allocate received service requests to the feasible edge servers. For example, the regional management server 126 maintains workload level information and locations of the edge servers 146-1, 146-2, 146-3, 146-4, 146-5. Based on the workload level information and locations of the edge servers 146-1, 146-2, 146-3, 146-4, 146-5, the regional management server 126 may allocate the service request from the vehicle A 310 to one of the edge servers 146-1, 146-2, 146-3, 146-4, 146-5.

Specifically, the locations of the edge servers 146-1, 146-3, 146-4 are proximate to the route 312 of the vehicle A 320 as shown in FIG. 3 such that the edge servers 146-1, 146-3, 146-4 are able to transfer the processing result of the service request when the vehicle A 320 is proximate to the edge servers 146-1, 146-3, 146-4. That is, the route 312 is within the communication ranges of the edge servers 146-1, 146-3, 146-4. In this regard, the regional management server 126 may consider the edge servers 146-1, 146-3, 146-4 as potential candidates to allocate the service request from the vehicle A 310.

The regional management server 126 may also retrieve workload level information about the edge servers 146-1, 146-3, 146-4 and allocate the service request from the vehicle A 310 to one of the edge servers 146-1, 146-3, 146-4 that is capable of completely processing the service request before the service vehicle A 310 arrives at the corresponding edge server. For example, if the edge server 146-1 has relatively low workload and is capable of fulfilling the service request from the vehicle A 310 before the vehicle A 310 arrives at the edge server 146-1, the regional management server 126 may allocate the service request from the vehicle A 310 to the edge server 146-1.

In embodiments, a regional management server may determine priority of a service request among a plurality of service requests received from a plurality of mobile objects. The regional management server may determine the priority of the service request based on comparison of the expected arrival time of the vehicle that submits the service request and expected arrival times of vehicles that submitted services requests that were previously allocated. For example, the regional management server 126 may allocate the service request from the vehicle A 310 to the edge server 146-1. Then, the regional management server 126 may try to allocate the service request from the vehicle B 320 to the edge server 146-1 based on comparison of the estimated arrival time of the vehicle A 310 and the estimated arrival time of the vehicle B 320 in the region 136 or at the edge server 146-1. If the estimated arrival time of the vehicle B 320 is earlier than the estimated arrival time of the vehicle A 310, the regional management server 126 may schedule the service request from the vehicle B 320 to be processed prior to the service request from the vehicle A 310. Thus, instead of using a typical FIFO queue, the present disclosure determines the priority of requests based on the expected arrival time of the vehicles that submit them.

A regional management server may fail to find any edge server that is capable of fulfilling a forwarded service request before the vehicle transmitting the service request arrives at the corresponding edge server. This may happen, for example, when all edge servers in the region have relatively high-level workload. For example, the central management server 110 forwards the service request from the vehicle A 310 to the regional management server 122, and the edge servers 142-1, 142-2, 142-3, 142-4, 142-5 in the region 132 have relatively high level workload such that all of the edge servers 142-1, 142-2, 142-3, 142-4, 142-5 are not able to fulfill the service request from the vehicle A 310 before the vehicle A 310 arrives in the region 132 or at any of the edge servers 142-1, 142-2, 142-3, 142-4, 142-5 in the region 132.

In this case, the regional management server may implement one of two different strategies. The first strategy is a lazy strategy where the regional management server simply rejects the service request and returns it to the central management server. For example, the regional management server 122 simply rejects the service request from the vehicle A 310 and returns the service request to the central management server 110. The central management server 110 may process the service request using traditional load balancing and request allocation techniques. Alternatively, the central management server 110 may forward the service request to another regional management server, e.g., the regional management server 126.

The second strategy is an eager strategy where the regional management server tries to discard some previously allocated service requests from some edge servers such that the new service request can be successfully scheduled on one of the edge servers before the vehicle arrives in the region or at the edge servers in the region. For example, the regional management server 122 may try to discard some service requests previously allocated to the edge servers 142-1, 142-2, 142-5. The workload of the edge server 142-2 may be reduced such that the edge server 142-2 is able to fulfill the service request from the vehicle A 310 before the vehicle arrives at the edge server 142-2. Then, the regional management server 122 may allocate the service request from the vehicle A 310 to the edge server 142-2 instead of simply rejecting the service request.

The second strategy is beneficial, for example, when the new service request is much more data intensive than existing requests on the edge server, and thus worth accommodating the new service request by removing some existing service requests. In order to determine whether or not to accommodate the new service request and which existing service requests to remove, the regional management server needs to maintain the data transmission cost and amount of workload of each service requests on the edge servers.

In embodiments, the regional management server may remove a sufficient amount of workload for accommodating the new service request that incurs minimum data transmission cost of the removed service requests. Certain optimization algorithms may be necessary for deciding which service requests to remove based on the information on the data transmission cost and amount of workload of each service request on the edge servers.

In embodiments, the regional management server may start removing the service request with the smallest data transmission cost until a sufficient amount of workload is saved for the new service requests. For example, five service requests are allocated to the edge server 142-2, and the edge server 142-2 has relatively high workload such that the edge server 142-2 cannot fulfill the service request from the vehicle A 310. The regional management server 122 may remove one of the five service requests on the edge server 142-2 that has the smallest data transmission cost. After removal, if the edge server 142-2 is capable of fulfilling the service request from the vehicle A 310 before the vehicle A 310 arrives in the region 132 or at the edge server 142-2, the service request is allocated to the edge server 142-2. After removal, if the edge server 142-2 is not still capable of fulfilling the service request from the vehicle A 310 before the vehicle A 310 arrives in the region 132 or at the edge server 142-2, the regional management server 122 removes one of the remaining service requests that has the smallest data transmission cost.

Discarded service requests may be returned to the central management server 110 either for redistribution or directly scheduled and allocated among the cloud servers. For example, if one of the service requests on the edge server 142-2 is discarded in order to accommodate the service request from the vehicle A 310, the discarded service request may be redistributed to another region, e.g., the region 136, if the route information associated with the discarded service request overlaps with the region 136.

In embodiments, a regional management server may choose either the lazy strategy or the eager strategy based on the data transmission cost of the new service request and/or the current level of management workload of the regional management server. For example, the regional management server may adopt the eager strategy, if the data transmission cost of the new request is not significantly greater than previously allocated requests. As another example, if the regional management server is currently subject to high level of workload, i.e., a large number of requests are being forwarded from the central management server to the regional management server, the regional management server may adopt the lazy strategy to avoid delay on processing the forwarded requests from the central management server. This is because the eager strategy requires performing additional optimization to determine the set of service requests to discard as described above.

Figure 4:
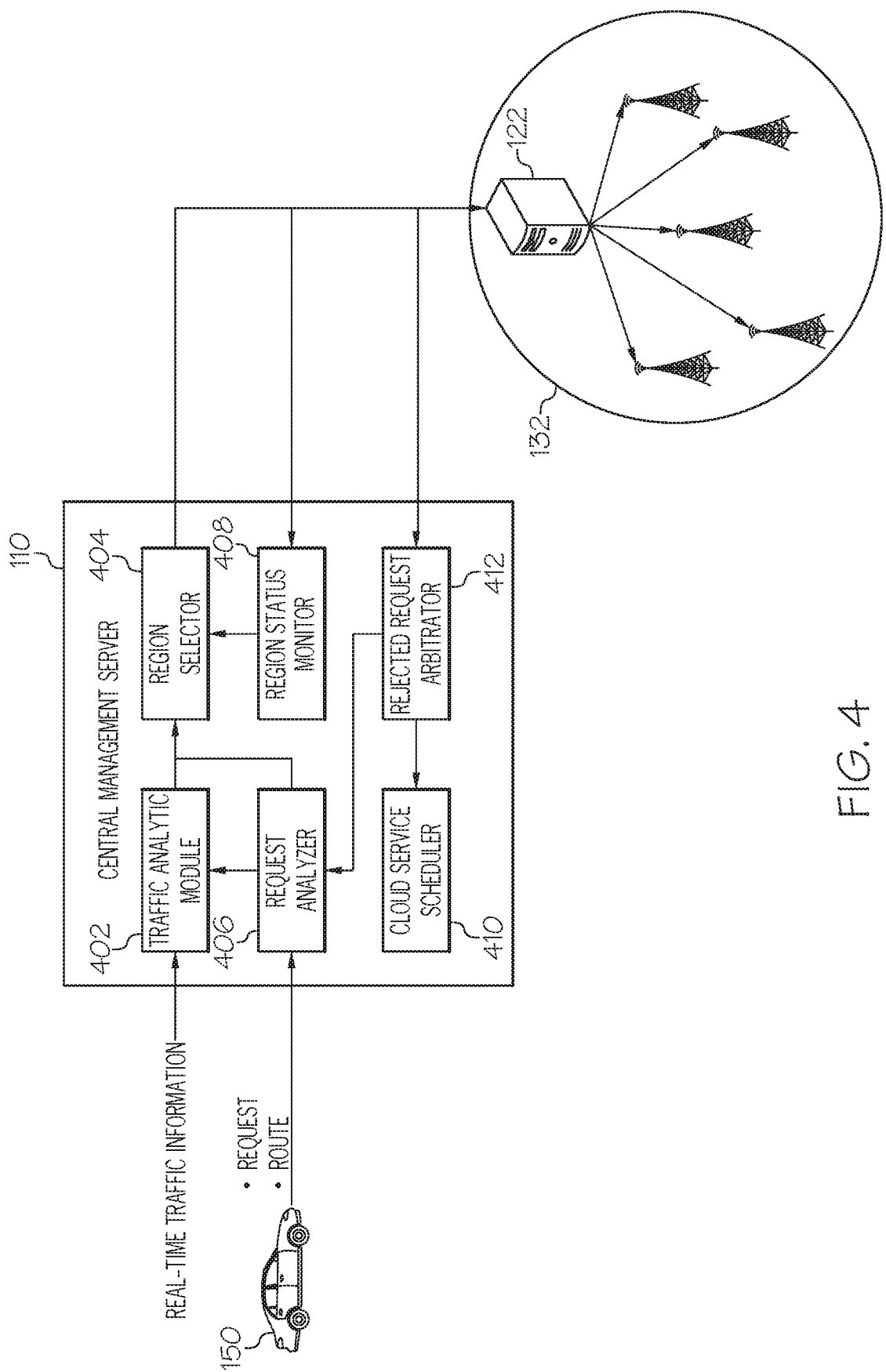
FIG. 4 depicts the high-level architecture of a central management server, according to one or more embodiments shown described herein.

FIG. 4 depicts the high level architecture of the central management server 110, according to one or more embodiments shown described herein. The central management server 110 includes a traffic analytic module 402, a region selector module 404, a request analyzer 406, a region status monitor module 408, a cloud service scheduler module 410, and a rejected request arbitrator 412. Each of the traffic analytic module 402, the region selector module 404, the request analyzer 406, the region status monitor module 408, the cloud service scheduler module 410, and the rejected request arbitrator 412 may be program modules in the form of operating systems, application program modules, and other program modules, while they may be physically stored in a variety of commonly known storage devices, for example, one or more memory modules 254 as shown in FIG. 2. Further, the program modules may also be stored in a remote storage device that may communicate with the central management server 110. Such program modules may include, but not limited to, routines, subroutines, programs, objects, components, data structures, and the like for performing specific tasks or executing specific data types as will be described below.

The request analyzer 406 is configured to receive a service request and route information from a vehicle, for example, the vehicle A 310 or the vehicle B 320 in FIG. 3. Additionally, the request analyzer 406 is configured to analyze the expected data transmission cost and workload level of the service request, and transmit the expected data transmission cost and workload level of the service request to the region selector module 404.

The traffic analytic module 402 is configured to obtain real-time traffic information from an external source (e.g., traffic authority) and receive the route information about the mobile object 150 from the request analyzer 406. The traffic analytic module 402 derives the expected arrival time of the mobile object 150 to each regions and/or edge servers based on the route information and the real-time traffic information and transmits it to the region selector module 404.

The region status monitor module 408 is configured to maintain the real time workload level of regions including request process workload and management workload. For example, the region status monitor module 408 may maintain the real time workload levels of the regions 132, 134, 136 including request process workload and management workload. The information may be stored in lookup table for query.

The region selector module 404 is configured to decide which region to forward the service request based on the analysis result provided from the traffic analytic module 402, the request analyzer 406 and the region status monitor module 408.

The rejected request arbitrator 412 is configured to handle rejected requests coming from different regions. These rejected requests may either be refed into the request analyzer 406 for redistribution to other regions or forwarded to the cloud service scheduler module 410 and processed by cloud servers. For example, if the regional management server 122 rejects the service request forwarded from the central management server 110, the rejected request arbitrator 412 may relay the rejected request to the request analyzer 406. The request analyzer 406 then analyzes the rejected service request and forwards the analyzed result to the region selector module 404 which selects another region to forward the rejected service request, e.g., the region 134.

Figure 5:
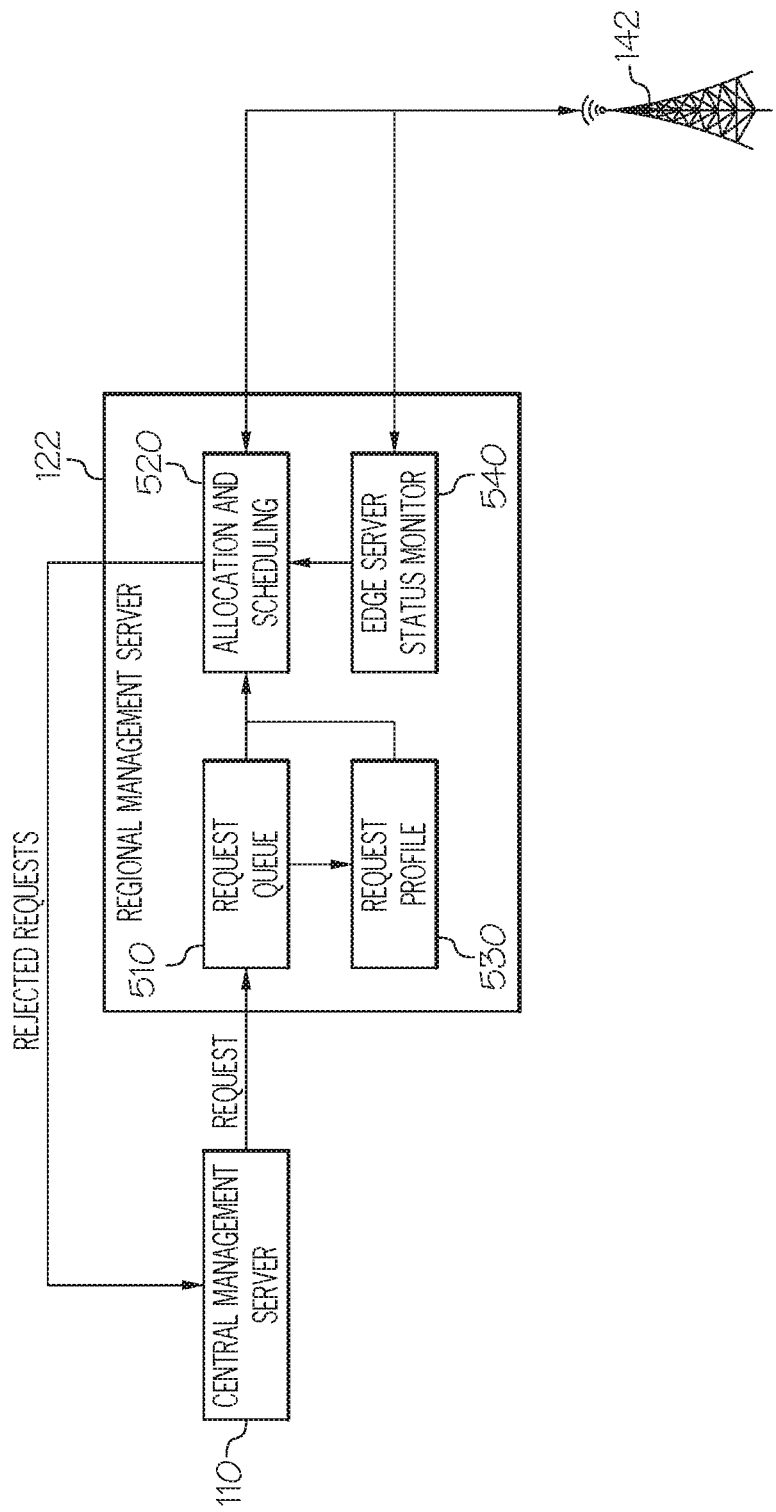
FIG. 5 depicts the high-level architecture of a regional management server, according to one or more embodiments shown described herein.

FIG. 5 depicts the high level architecture of the regional management server 122, according to one or more embodiments shown described herein. The regional management server 122 includes a request queue module 510, an allocation and scheduling module 520, a request profile module 530, and an edge server status monitor module 540. Each of the request queue module 510, the allocation and scheduling module 520, the request profile module 530, and the edge server status monitor module 540 may be program modules in the form of operating systems, application program modules, and other program modules, while they may be physically stored in a variety of commonly known storage devices, for example, one or more memory modules 264 as shown in FIG. 2. Further, the program modules may also be stored in a remote storage device that may communicate with the regional management server 122. Such program modules may include, but not limited to, routines, subroutines, programs, objects, components, data structures, and the like for performing specific tasks or executing specific data types as will be described below.

The request queue module 510 is configured to queue service requests from the central management server 110. The request queue module 510 may de-queue one of the queue service requests and forwarded the de-queued service request to the request profile module 530.

The request profile module 530 is configured to record the de-queued service request. The request profile module 530 also stores information on workload of the service request and an expected arrival time of the vehicle that submitted the service request. The request profile module 530 may store information on expected transmission costs of the de-queued service requests.

The edge server status monitor module 540 is configured to maintain the location and workload level information of each edge server in the region. For example, the edge server status monitor module 540 maintains the location and workload level information of each of the edge servers 142-1, 142-2, 142-3, 142-4, 142-5 as shown in FIG. 3. The edge server status monitor module 540 may receive workload level information from the edge servers and update the workload level information in real time. The edge server status monitor module 540 may provide the location and workload level information of each edge server in the region to the allocation and scheduling module 520.

The allocation and scheduling module 520 is configured to receive the service request from the request profile module 530 and/or the request queue module 510. The allocation and scheduling module 520 searches for feasible edge servers and determines priority for the service request such that the service request can be fulfilled before the vehicle that submitted the service request arrives in the corresponding region or the corresponding edge server. The allocation and scheduling module 520 determines feasible edge servers and priority for the service request based on the location and workload level information of each edge server in the region received from the edge server status monitor module 540.

When the allocation and scheduling module 520 fails to find any feasible edge server for fulfilling the service request, the allocation and scheduling module 520 may turn to use the eager strategy discussed above. When using the eager strategy, the allocation and scheduling module 520 refers to the information maintained in the request profile module 530, which contains information on expected transmission costs of service requests and workload level on each edge server. Based on the information on expected transmission costs of service requests and workload level on each edge server, the allocation and scheduling module 520 may select the most suitable set of service requests to discard from edge servers. The discarded or rejected requests are then returned to the central management server 110.

FIG. 6 depicts a flowchart of allocating and scheduling a service request from a vehicle, according to one or more embodiments shown and described herein. In step 610, a central management server receives a service request and a route of a mobile object from the mobile object. The mobile object may include, but is not limited to, a vehicle, an unmanned aerial vehicle, a mobile phone, an airplane, etc. For example, by referring to FIG. 3, the central management server 110 receives a service request and a route of a vehicle from the mobile object 150. The vehicle 310 may transmit its service request and the route 312 of the vehicle 310 to the central management server 110.

In step 620, the central management server 110 determines estimated arrival times of the vehicle in a plurality of regions based on the route. The plurality of regions are associated with a plurality of regional servers, respectively. For example, by referring to FIG. 3, the central management server 110 determines estimated arrival times of the vehicle 310 in the region 132 and the region 136 based on the route 312 of the vehicle 310 and real-time traffic information. In this example, because the route 312 does not overlap with the region 134, the central management server 110 may not determine estimated arrival time of the vehicle 310 in the region 134.

In some embodiments, the central management server 110 may determine estimated arrival times of the vehicle at edge servers in respective regions based on the route, the locations of the edge servers, and real-time traffic information. The central management server 110 may determine which edge servers have communication coverage that covers the route. For example, the central management server 110 may determine that the edge servers 142-1, 142-2, 142-5 in the region 132 have communication coverage that covers the route 312, and that the edge servers 146-1, 146-3, 146-4 in the region 136 have communication coverage that covers the route 312. Then, the central management server 110 may determine estimated arrival times of the vehicle at edge servers 142-1, 142-2, 142-5, 146-1, 146-4, and 146-3, respectively.

In step 630, the central management server 110 may determine one or more of the plurality of regions based on the estimated arrival times of the vehicle in the plurality of regions. In embodiments, the central management server 110 may determine one or more of the plurality of regions by comparing the estimated arrival times of the vehicle in the plurality of regions and an expected time for fulfilling the service request by each edge server. For example, if the estimated arrival time of the vehicle 310 in the region 132 is 10 minutes, and the expected time for fulfilling the service request by any of the edge servers in the region 132 is less than 10 minutes, the central management server 110 may determine the region 132 as a candidate to forward the service request. In addition, if the estimated arrival time of the vehicle 310 in the region 136 is 25 minutes, and the expected time for fulfilling the service request by any of the edge servers in the region 136 is less than 25 minutes, the central management server 110 may also determine the region 136 as a candidate to forward the service request.

In some embodiments, the central management server 110 may determine one or more of the plurality of regions further based on workload of the plurality of regions. The workload may include processing workload on each edge server in the region and management workload at the regional management server. For example, if the workload of the region 132 is relatively high and the workload of the region 136 is relatively low, the central management server 110 may determine the region 136 as a candidate to forward the service request.

In step 640, the central management server 110 transmits the service request to the one or more regional servers corresponding to the one or more regions determined in step 630. For example, the central management server 110 may forward the service request to the regional management server 122 and the regional management server 126. As another example, the central management server 110 may forward the service request to the regional management server 126 only.

In step 650, each of the regional management servers that received the service request determines whether any of the edge servers associated with the regional management server is capable of fulfilling the service request before the vehicle that submitted the service request arrives in corresponding region or at the edge servers. For example, the regional management server 122 determines whether any of the edge servers 142-1, 142-2 and 142-5 is capable of fulfilling the service request form the vehicle 310 before the vehicle 310 arrives in the region 132 or at each of the edge servers 142-1, 142-2 and 142-5.

If it is determined that any of edge servers associated with the regional management server is capable of fulfilling the service request before the vehicle that submitted the service request arrives in corresponding region or at the edge servers, the regional management server may allocate the service request to one of the edge servers in step 660. In embodiments, the regional management server may determine feasible edge servers and priority for the service request based on the location and workload level information of each edge server in the region. For example, the regional management server 122 may determine that the edge server 142-5 is capable of fulfilling the service request from the vehicle 310 before the vehicle 310 arrives at the edge server 142-5 based on the location of the edge server 142-5 and workload level information of the edge server 142-5.

In embodiments, the service request may be allocated to more than one edge server. For example, the regional management server 122 determines that the edge server 142-5 is capable of fulfilling the service request from the vehicle 310 before the vehicle 310 arrives at the edge server 142-5, and allocates the service request to the edge server 142-5. In addition, the regional management server 126 determines that the edge server 146-1 is capable of fulfilling the service request from the vehicle 310 before the vehicle 310 arrives at the edge server 146-1, and allocates the service request to the edge server 146-1.

In some embodiments, the service request may be allocated to a single edge server. For example, when it is determined that both the edge server 142-5 and the edge server 146-1 are capable of fulfilling the service request from the vehicle 310 before the vehicle 310 arrives, the central management server 110 may select one of the regional management servers 122 and 126 such that the service request is allocated to one of the edge servers 142-5 and 146-1.

If it is determined that any of edge servers associated with the regional management server is capable of fulfilling the service request before the vehicle that submitted the service request arrives in the corresponding region or at the edge servers, the regional management server may determine whether to adopt a lazy strategy or an eager strategy in step 670. In embodiments, the regional management server may determine whether to adopt the lazy strategy or the eager strategy based on data transmission cost of the service request and a workload level of the determined regional server. For example, if the data transmission cost of the service request is not significantly greater than data transmission costs of the service requests previously allocated to edge servers, the regional management server may adopt the eager strategy. As another example, if the regional management server is currently subject to relatively high level of workload (e.g., a large number of requests is being forwarded from the central management server) compared to other regional management servers, the regional management server may adopt the lazy strategy to avoid delay on processing the service request.

If the eager strategy is adopted, the regional management server discards one or more service requests previously allocated to one or more edge servers associated with the determined regional server in step 680. In embodiments, the regional management server may start removing the previously allocated service request with the smallest data transmission cost until a sufficient amount of workload has been saved for the new service requests. For example, by referring to FIG. 3, five service requests are allocated to the edge server 142-2. The regional management server 122 removes one of the five service requests on the edge server 142-2 that has the smallest data transmission cost. After removal, if the edge server 142-2 is capable of fulfilling the service request from the vehicle A 310 before the vehicle A 310 arrives in the region 132 or at the edge server 142-2, the service request is allocated to the edge server 142-2. After removal, if the edge server 142-2 is not still capable of fulfilling the service request from the vehicle A 310 before the vehicle A 310 arrives in the region 132 or at the edge server 142-2, the regional management server 122 removes one of the remaining service requests that has the smallest data transmission cost. The removing process may be repeated until any of the edge servers becomes capable of fulfilling the service request.

If the lazy strategy is adopted, the regional management server rejects the service request in step 690. In embodiments, the regional management server may reject the service request and return the service request to the central management server. For example, by referring to FIG. 3, the regional management server 122 simply rejects the service request from the vehicle A 310 and returns the service request to the central management server 110. The central management server 110 may process the service request servers using traditional load balancing and request allocation technique. Alternatively, the central management server 110 may forward the service request to another regional management server, e.g., the regional management server 136, if the service request was not previously forwarded to the regional management server 136.

Figure 7:
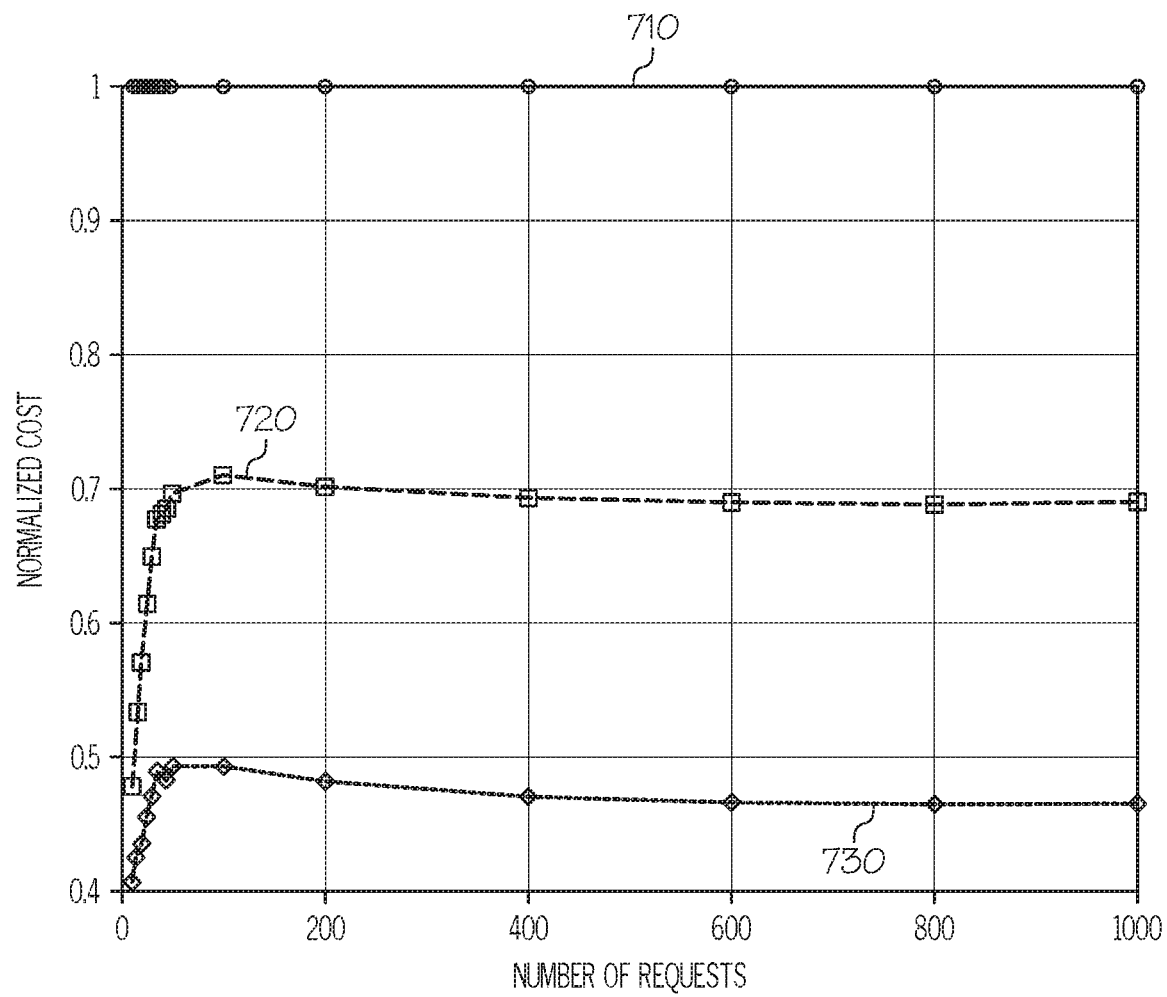
FIG. 7 depicts a graph showing experimental data according to one or more embodiments shown and described herein.
Figure 8:
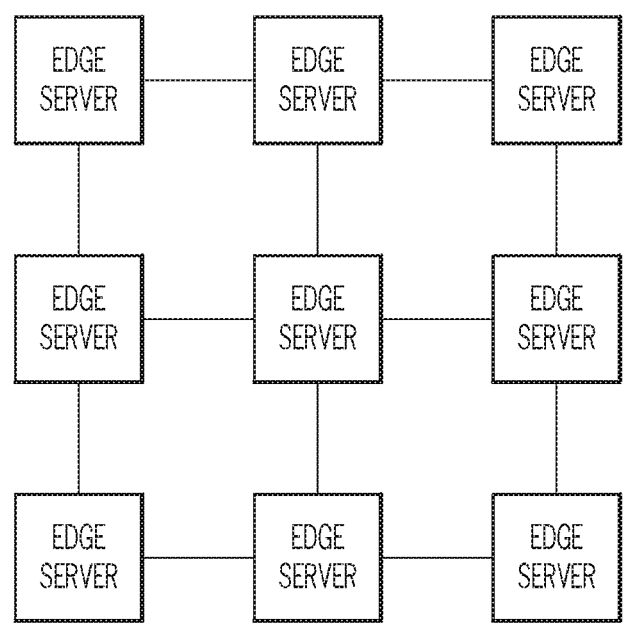
FIG. 8 depicts an example of traffic topology of 3 by 3 squared grid according to one or more embodiments shown and described herein.

FIG. 7 depicts a graph showing experimental data according to one or more embodiments shown and described herein. The experimental data is obtained from traffic topology of 3 by 3 squared grid where each vertex represents an edge server as shown in FIG. 8. In the experiment, each of a plurality of vehicles (e.g., 10 to 1,000 vehicles) submits one request with a different cost including a computation cost and a transmission cost. In FIG. 7, costs of three scenarios are compared. The first line 710 depicts normalized cost for a first scenario where all requests from vehicles are scheduled in a remote cloud server. The second line 720 depicts normalized cost for a second scenario where each request from vehicles is greedily scheduled to an edge server that minimizes the cost it incurs. The third line 730 depicts normalized cost when the system is based on a local adjustment heuristic that further optimizes the second scenario into a locally optimal solution with respect to trajectories of vehicles. As shown in FIG. 7, after properly optimizing allocation of service requests with respect to the trajectory of vehicles, the cost is significantly reduced, for example, 30% to 60%.

It should be understood that embodiments described herein are directed to systems and methods for allocating and scheduling service requests from mobile objects among edge servers based on the routes of the mobile objects and estimated times for fulling the service request. A central management server receives a service request and a route of a mobile object and determines estimated arrival times of the mobile object in a plurality of regions based on the route. The plurality of regions are associated with a plurality of regional servers, respectively. The central management server determines a region among the plurality of regions based on the estimated arrival times of the mobile object in the plurality of regions and estimated time for fulfilling the service request, and transmits the service request to a regional server corresponding to the determined region. The regional server selects one of its edge servers and allocates the service request to the selected edge server such that the service request is fulfilled by the selected edge server before the mobile object arrives at the selected edge server.

The present disclosure provides a system for allocating a service request and balancing load among multiple regional servers and/or edge servers that takes into consideration the trajectory information of a vehicle submitting the service request. The allocated regional server or edge server for processing the submitted service request would be geographically close to the vehicle upon service request fulfillment. This not only helps reduce data transmission latency but also the data transmission cost charged by network provider. Specifically, if a request is allocated to an edge server and fulfilled before the submitting vehicle arrives at the edge server, a cost including a transmission cost and a computation cost can be significantly reduced.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for allocating a service request from a mobile object, the method comprising:
   receiving the service request and a route of the mobile object;
   determining estimated arrival times of the mobile object in a plurality of regions based on the route, the plurality of regions being associated with a plurality of regional servers, respectively;
   determining a region among the plurality of regions based on whether an estimated time for fulfilling the service request is prior to the estimated arrival time of the mobile object in the region; and
   transmitting the service request to a regional server corresponding to the determined region.

2. The method of claim 1, further comprising:
   determining another region among the plurality of regions based on the estimated arrival times of the mobile object in the plurality of regions and the estimated time for fulfilling the service request; and transmitting the service request to another regional server corresponding to the determined another region.

3. The method of claim 1, further comprising:
monitoring workload levels of the plurality of regional servers; and
determining the region among the plurality of regions further based on the workload levels of the plurality of regional servers.

4. The method of claim 1, further comprising:
determining the regions among the plurality of regions based on comparison of the estimated arrival times of the mobile object in the plurality of regions and the estimated time for fulfilling the service request.

5. The method of claim 1, further comprising:
allocating, by the regional server, the service request to one or more of edge servers associated with the regional server.

6. The method of claim 1, further comprising:
determining, by the regional server, whether one or more of edge servers in the determined region is capable of fulfilling the service request before the mobile object arrives at the one or more edge servers based on the estimated arrival times of the mobile object at the edge servers, and estimated times for fulfilling the service request by the one or more edge servers; and
adopting one of a first strategy and a second strategy in response to determination that no edge server in the determined region is capable of fulfilling the service request before the mobile object arrives at the edge servers.

7. The method of claim 6, further comprising:
adopting one of the first strategy and the second strategy based on data transmission cost of the service request and a workload level of the regional server.

8. The method of claim 6, further comprising:
rejecting, by the regional server, the service request in response to adopting the first strategy.

9. The method of claim 6, further comprising:
discarding one or more service requests previously allocated to one or more edge servers in the determined region in response to adopting the second strategy.

10. The method of claim 9, wherein discarding one or more service requests allocated to one or more edge servers in the determined region comprises:
comparing a data transmission cost of the service request and data transmission costs of the one or more service requests previously allocated to the one or more edge servers in the determined region; and
discarding the one or more service requests previously allocated to the one or more edge servers in the determined region based on the comparison.

11. The method of claim 1, wherein estimated arrival times of the mobile object in the plurality of regions include estimated arrival times of the mobile object at edge servers in the plurality of regions.

12. A system for allocating a service request, the system comprising:
a plurality of regional servers; and
a central server configured to:
receive, from a mobile object, the service request and a route of the mobile object;
determine estimated arrival times of the mobile object in a plurality of regions based on the route, the plurality of regions being associated with the plurality of regional servers, respectively;
determine a region among the plurality of regions based on whether an estimated time for fulfilling the service request is prior to the estimated arrival time of the mobile object in the region; and
transmit the service request to a regional server corresponding to the determined region.

13. The system of claim 12, wherein the central server is further configured to:
monitor workload levels of the plurality of regional servers; and
determine the region among the plurality of regions further based on the workload levels of the plurality of regional servers.

14. The system of claim 12, wherein the central server is further configured to:
determine the region among the plurality of regions based on comparison of the estimated arrival times of the mobile object in the plurality of regions and the estimated time for fulfilling the service request.

15. A method for allocating a service request of a mobile object, the method comprising:
receiving the service request and a route of the mobile object;
determining estimated arrival times of the mobile object at one or more edge servers in a region based on the route;
selecting one of the one or more edge servers based on whether an estimated time for fulfilling the service request is prior to the estimated arrival time of the mobile object at one of the one or more edge servers; and
allocating the service request to the selected edge server.

16. The method of claim 15, further comprising:
determining whether one of the one or more edge servers is capable of fulfilling the service request before the mobile object arrives at the one or more edge servers based on the estimated arrival times of the mobile object at the one or more edge servers, and estimated times for fulfilling the service request by the one or more edge servers; and
adopting one of a first strategy and a second strategy in response to determination that none of the one or more edge servers is capable of fulfilling the service request before the mobile object arrives at the one or more edge servers.

17. The method of claim 16, further comprising:
adopting one of the first strategy and the second strategy based on data transmission cost of the service request and a workload level of a regional server associated with the region.

18. The method of claim 16, further comprising:
rejecting the service request, in response to adopting the first strategy.

19. The method of claim 16, further comprising:
discarding one or more service requests previously allocated to the one or more edge servers, in response to adopting the second strategy.

20. The method of claim 19, wherein discarding one or more service requests allocated to the one or more edge servers comprises:
comparing a data transmission cost of the service request and data transmission costs of the one or more service requests previously allocated to the one or more edge servers; and
discarding the one or more service requests previously allocated to one or more edge servers based on the comparison.

* * * * *